E. S. JOHNSON.
ANIMAL FEEDING DEVICE.
APPLICATION FILED SEPT. 17, 1918.

1,322,698.

Patented Nov. 25, 1919.

Inventor,
E. S. Johnson, by
G. C. Kennedy,
Attorney.

UNITED STATES PATENT OFFICE.

ERNEST S. JOHNSON, OF WEBSTER CITY, IOWA.

ANIMAL-FEEDING DEVICE.

1,322,698.      Specification of Letters Patent.      Patented Nov. 25, 1919.

Application filed September 17, 1918. Serial No. 254,393.

*To all whom it may concern:*

Be it known that I, ERNEST S. JOHNSON, a citizen of the United States of America, and a resident of Webster City, Hamilton county, Iowa, have invented certain new and useful Improvements in Animal-Feeding Devices, of which the following is a specification.

My invention relates to improvements in animal feeding devices, and the object of my improvement is to supply for hogs or other animals a feeding device operable by the animal in the lifting of a trough-closure with resultant stirring of the hopper contents by means actuated by the moving closure to insure free delivery of the feed, while protecting and conserving the feed left in the trough after lowering of the closure.

Figure 1:
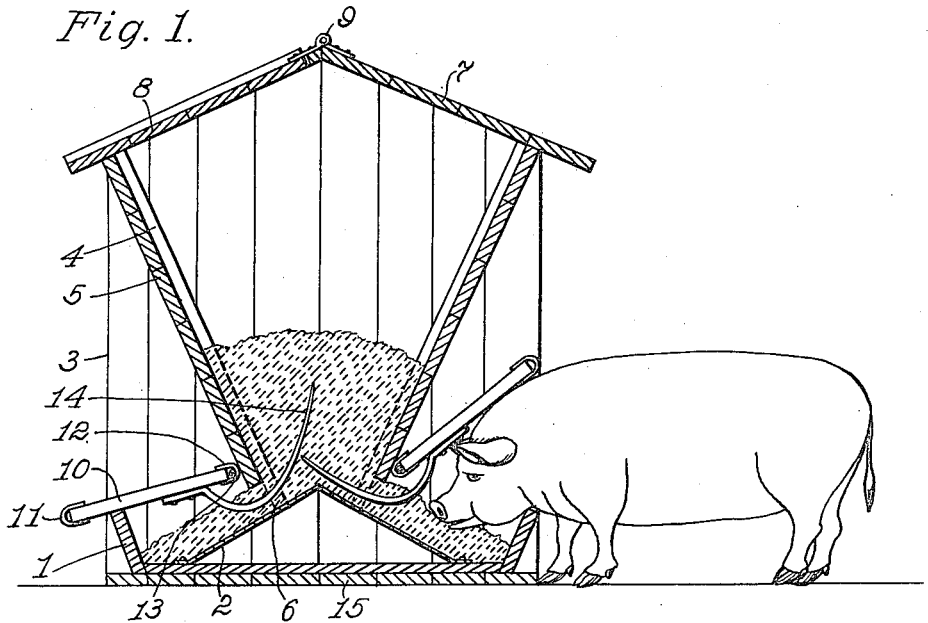
Figure 2:
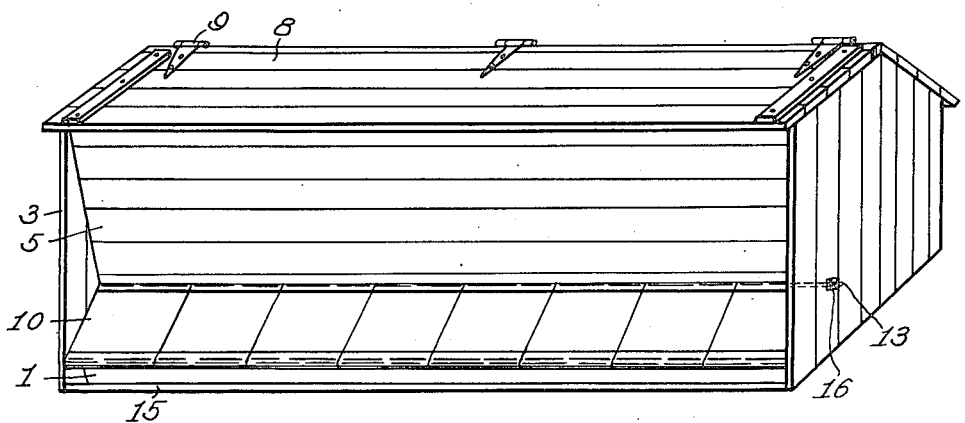

This object I have accomplished by the means which are hereinafter described and claimed, and which are illustrated in the accompanying drawings, in which Figure 1 is a cross-section of my improved device, and Fig. 2 is a perspective view of one longitudinal side of the device.

Similar numerals of reference denote corresponding parts throughout the several views.

My improved animal feeding device consists essentially of a hopper, a feeding-trough, a deflecting-device for the feed passing from the hopper into the trough, and a swinging closure for the trough operable by an animal, said closure having attached stirring-means extending into the hopper delivery-opening.

The hopper 5 has its longitudinal walls converged downwardly and secured to bars 4 fixed on the inner end-walls, their lower ends spaced longitudinally to provide a vent. The top of the hopper is closed by a doubly-pitched roof 7—8, of which the part 8 is a section swingingly mounted on hinges 9 to swing upwardly to allow the introduction of feed.

Positioned below the lower end of said hopper and spaced therefrom is a shallow feeding-trough mounted on a base 15 and having longitudinal outwardly-sloped side walls 1, the walls 1 being located a suitable distance on each side of the hopper to give enough feeding room therebetween, and thus supplying on opposite sides of the hopper feeding troughs located longitudinally therealong.

The ends of said hopper are closed by vertical boarding 3, which extends to the sides to cover the ends of the feed troughs 1.

Along the outside and just above the lower longitudinal edges of the hopper are positioned rods 13, whose extremities are passed through openings in the end-walls of the hopper and are secured by means of nuts 16 on their threaded ends. Upon these rods are swingingly hinged on each side of the hopper, a plurality of alined and edgewise contacting closures for the exposed open outer parts of said feeding-trough 1, so that any of these closures can be lifted independently of the others.

They may be hinged in any desired way, but as shown, the upper and lower longitudinal edges of the closures are inclosed in U-bar sections 12 and 11 respectively, of which the U-bars 12 receive the rods 13 pivotally, that is, serve to suspend the closures swingingly on the rods to normally close the troughs by gravity, the outer or lower parts of the closures projecting beyond the outer walls of the troughs. I have shown feed deflecting-means 2 in said trough 1, comprising oppositely pitched planes located medially and longitudinally below the vent of said hopper, spaced therefrom to supply two longitudinal delivery-openings leading oppositely into the said opposite trough parts. This deflecting-device may be dispensed with, however, if desired, without defeating the object of my invention, but as a combination feature, aids in the delivery of the feed oppositely from the hopper basal vent into said trough parts. Feed is delivered from the hopper by gravity into said trough parts through the longitudinal openings 6 between the inclined planes 2 and the vent edges, and to prevent arching of the feed over said openings, I have provided the following stirring-means.

On the lower face of each closure 10 is fixed the shank of an upwardly inclined sickle-shaped stirring-blade or member 14, which extends through the opening 6 into the lower part of the hopper. These stirring-members 14 are actuated to agitate the feed in the lower part of the hopper when the closures 10 are lifted by an animal, as also when the closures are dropped as the animal withdraws its head after feeding from the trough. The animal soon learns to lift the outwardly-projecting part of the closure 10, and the U-bar cover for its outer edge keeps the animal from biting and injuring the closure. The closures therefore protect the feed in said troughs from the weather, and from depredations of fowls.

Having described my invention, what I claim as new, and desire to secure by letters patent, is:

1. An animal feeding device, comprising a hopper having a basal delivery-vent, a feeding-trough below said vent to receive therefrom and having a part of its open top exposed, a swinging closure for the exposed part of said trough closing by gravity, said closure having its free end projected outwardly beyond the trough, and a U-bar mounted over the said outward end of said closure.

2. In an animal feeding device, a hopper having a delivery-vent, a trough positioned below said vent, a rod positioned along the outside of the hopper, a closure for the trough top closing by gravity and projecting therebeyond, and U-bars inclosing opposite inner and outer ends of said closure, of which the inner U-bar is hung pivotally upon said rod to furnish a hinge-connection therefor.

Signed at Webster City, Iowa, this 30th day of August, 1918.

ERNEST S. JOHNSON.